(12) United States Patent
Patel et al.

(10) Patent No.: US 8,788,459 B2
(45) Date of Patent: Jul. 22, 2014

(54) CLUSTERING FOR HIGH AVAILABILITY AND DISASTER RECOVERY

(71) Applicant: Splunk Inc., San Francisco, CA (US)

(72) Inventors: Vishal Patel, San Francisco, CA (US); Mitchell Neuman Blank, Jr., San Francisco, CA (US); Sundar Rengarajan Vasan, San Francisco, CA (US); Stephen Phillip Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 13/648,116

(22) Filed: Oct. 9, 2012

(65) Prior Publication Data

US 2013/0311427 A1 Nov. 21, 2013

Related U.S. Application Data (60) Provisional application No. 61/647,245, filed on May 15, 2012.

(51) Int. Cl.
*G06F 17/30* (2006.01)

(52) U.S. Cl.
USPC .......................... 707/610; 707/770; 707/830

(58) Field of Classification Search
USPC .......................... 707/614, 830, 696
See application file for complete search history.

(56) References Cited

U.S. PATENT DOCUMENTS

| | | | |
|---|---|---|---|
| 6,839,819 B2 | 1/2005 | Martin | |
| 7,085,904 B2 | 8/2006 | Mizuno et al. | |
| 7,162,601 B2 | 1/2007 | Yamagami | |
| 7,167,880 B2 | 1/2007 | Amano et al. | |
| 7,243,197 B2 | 7/2007 | Yamagami | |
| 7,693,885 B2 | 4/2010 | Okada et al. | |
| 8,112,425 B2 | 2/2012 | Baum et al. | |
| 8,195,153 B1 | 6/2012 | Frencel et al. | |
| 2004/0268067 A1 | 12/2004 | Yamagami | |
| 2005/0015416 A1 | 1/2005 | Yamagami | |
| 2005/0235016 A1 | 10/2005 | Amano et al. | |
| 2006/0149798 A1 | 7/2006 | Yamagami | |
| 2006/0179129 A1* | 8/2006 | Clayton et al. | 709/220 |
| 2007/0083567 A1 | 4/2007 | Arai et al. | |
| 2007/0100917 A1 | 5/2007 | Amano et al. | |
| 2007/0112893 A1 | 5/2007 | Okada et al. | |
| 2007/0112894 A1 | 5/2007 | Okada et al. | |
| 2007/0115738 A1 | 5/2007 | Emaru et al. | |

(Continued)

FOREIGN PATENT DOCUMENTS

EP 1804167 A3 1/2008

OTHER PUBLICATIONS

Marshall Brain, How Domain Servers Work, Feb. 1, 2009, pp.*

(Continued)

*Primary Examiner* — Albert Phillips, III (74) *Attorney, Agent, or Firm* — Hickman Palermo Truong Becker Bingham Wong LLP; Kirk D. Wong (57) ABSTRACT

Embodiments are directed towards managing within a cluster environment having a plurality of indexers for data storage using redundancy the data being managed using a generation identifier, such that a primary indexer is designated for a given generation of data. When a master device for the cluster fails, data may continue to be stored using redundancy, and data searches performed may still be performed.

30 Claims, 7 Drawing Sheets

(56) References Cited

U.S. PATENT DOCUMENTS

| | | | |
|---|---|---|---|
| 2007/0185923 A1 | | 8/2007 | Nishikawa et al. |
| 2007/0198604 A1 | | 8/2007 | Okada et al. |
| 2007/0220309 A1 | | 9/2007 | Andre et al. |
| 2009/0271412 A1* | 10/2009 | Lacapra et al. | ................. 707/10 |
| 2010/0191922 A1* | 7/2010 | Dickey et al. | ................. 711/154 |
| 2012/0144033 A1* | 6/2012 | Daude et al. | ................. 709/224 |

OTHER PUBLICATIONS

The Authoritative Dictionary of IEEE Standards Terms, 7th Ed., 2000, p. 123.*

Adams, Michael, "How Snapshot Technology Will Change the Future of Backup and Recovery"—Technology Information, Computer Technology Review, Jan. 2001. cited by other.

Kaczmarski, M., "Beyond Backup Toward Storage Management," IBM Systems Journal, vol. 42, No. 2, Apr. 2003. cited by other.

"RAID," Wikipedia, the free encyclopedia, Last Modified Nov. 2, 2012, http://en.wikipedia.org/wiki/RAID, pp. 1-23.

"High-Availability Cluster", Wikipedia, Free Encyclopedia, Last Modified Oct. 24, 2012, http://en.wikipedia.org/wiki/High_availability_cluster, pp. 1-4.

Carasso, D., "Exploring Splunk: Search Processing Language (SPL) Primer and Cookbook," Splunk, Apr. 2012.

Official Communication for U.S. Appl. No. 13/662,358 mailed Jan. 28, 2013.

Final Office Action of Aug. 1, 2013 for U.S. Appl. No. 13/662,358, 27 pages.

* cited by examiner

CLUSTERING FOR HIGH AVAILABILITY AND DISASTER RECOVERY

CROSS-REFERENCE TO RELATED APPLICATIONS

This non-provisional patent application claims the benefit under 35 U.S.C. §119(e) and 37 C.F.R. §1.78 of U.S. Provisional Patent Application Ser. No. 61/647,245, entitled "Clustering for High Availability and Disaster Recovery," filed on May 15, 2012, which is incorporated herein by reference in its entirety.

TECHNICAL FIELD

The disclosed embodiments relate generally to managing data storage and recovery and, more particularly, but not exclusively, to managing within a cluster environment data storage using data replication and generation identifiers for data storage and recovery.

BACKGROUND

Today's Internet has evolved into a ubiquitous network that has compelled many businesses to rely upon it as a major resource for doing business. For example, many businesses may employ services on the Internet to perform backup of their various aspects of their local computing resources, including providing for high availability of backed up data.

In response to the need to provide for a networking infrastructure with both high availability of data and recover from disasters, cluster architectures were developed. Briefly, a cluster architecture can be defined as multiple loosely coupled network devices that cooperate to provide client devices access to one or more services over the network.

However, some cluster architectures that are employed for data backup may spread different portions of data across a large number of members within the cluster to minimize the likelihood of loss of large amounts of data should one of the members fail. However, when loss of even a portion of the data may be significant to the clients depending upon the cluster, this may not be a tolerable result. Therefore, It is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the various embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards managing data backup and access within a cluster environment having a plurality of member indexers using storage redundancy (or replication). Although described in more detail below, an indexer is any computing device arranged to store and retrieve data. A member indexer may be selected as a primary source for data storage by a forwarder device that is external to the cluster, where briefly, a forwarder device is any computing device configured to produce, discover, or collate data and then send the data to an indexer.

In one embodiment, the data may be stored in what is herein termed "buckets." In any event, the forwarder device may, in one embodiment, operate within a client device. In one embodiment, the forwarder device may employ a load balancing algorithm to select the member indexer to which to send data. In one embodiment, each forwarder device within a plurality of forwarder devices may select an indexer independent of another forwarder device. The forwarder device may, in one embodiment, specify a number of copies or a number of times the data is to be replicated for data recovery, herein termed a "replication factor." However, in other embodiments, the replication factor may be configured on an indexer based on a variety of factors, including, a type of data to be replicated. In any event, the selected indexer may generate a journal about the received data, including metadata, usable to rebuild the data. The journal and data may then be sent to one or more other member indexers for replication. In one embodiment, the selected indexer may be designated as a primary member indexer for the received data. In one embodiment, a cluster master may identify a number of other member indexers that may be secondary indexers for the data based, in part, on availability to receive and to save replicates of the data. The number of secondary indexers selected corresponds to the number of desired replications indicated by the forwarder device. In one embodiment, the secondary indexers may also be called "shadow" indexers. Moreover, in at least one embodiment, the data being saved may be termed a "slice of data." Further, a member indexer may be designated primary (or secondary) for one bucket of data, and secondary (or primary) for a different bucket of different data. Thus, in one embodiment, a bucket on an indexer may be considered primary for some requests, such as for example, searches originating from the east coast, while being designated as secondary for other requests, such as searches originating from the west coast, or the like.

The primary indexer provides an Acknowledgement (ACK) message to the forwarder device to indicate that the received data has been received and saved. ACK messages may be received by the primary indexer from the secondary indexers to indicate that they respectively received and saved the data for replication. Failure to return an ACK to the forwarder when initially sending data may result in the forwarder device selecting a different indexer. Failure to return an ACK by a secondary indexer to the primary may result in either resending of the data to the secondary, or a selection of another secondary, as appropriate.

Transitions of a primary indexer for a given bucket, either due to a planned or an unplanned event, is managed using a generation identifier (GEN_ID) that indicates a particular time based set of the data. Thus, an indexer may be designated as primary for a given bucket for GEN_ID of, say zero, but a different indexer may be primary for the bucket at a different GEN_ID of, say one. Further, a bucket on an indexer may be primary for different types of searches at different GEN_IDs. The GEN_ID then may be a point at which these 'primacy' decisions can be changed. Thus, as an aside, for example, at GEN_ID equal to say 100, bucket A on indexer 1 may be primary—for everything, and bucket A on indexer 2 is secondary. Then, at GEN_ID equal to 150, these roles may change, where bucket A on indexer 1 is primary for east coast searches, and secondary for west coast searches, while indexer 2 is then the opposite: primary for west coast searches and secondary for east coast searches. Further, at GEN_ID of 200, this may change again, where bucket A on indexer 1 is secondary for all searches, and indexer 2's bucket A is primary for all searches. Thus, at every generation, every bucket's primacy settings may be set so every search will visit each bucket once. For example, this invariant might be violated if bucket A were simultaneously primary for all searches on indexer 1 and primary for east coast searches on indexer 2. Then a search coming from the east coast would get data from bucket A twice. This is prevented however, by monitoring the GEN-ID, when the GEN_IDs new primacy rules can be in effect.

In any event, in one embodiment, GEN_ID may be a monotonically increasing counter. Moreover, in one embodiment, GEN_ID may be global across all buckets of stored data by the cluster.

In one embodiment, search requests, retrieval of stored data, or any of a variety of data recovery requests may be initiated by a searcher device, sometimes referred to as a "search head." In one embodiment, the searcher device may reside within a client device, or be another device accessed by the client device. In one embodiment, the searcher device may be external from the cluster. In any event, a request may include information, including a GEN_ID, indicating which generation of data is being requested. In one embodiment, the GEN_ID may be obtained by the searcher device from the master device.

In one embodiment, the request may be broadcast to all of the member indexers. However, the request may be ignored by secondary indexers for that GEN_ID. The primary indexer for that GEN_ID responds to the request for the data. Moreover, because secondary indexers do not respond to the request, a search request does not receive multiple responses of the same data. Should the primary indexer fail, or otherwise fail to respond to the request, in one embodiment, a master device may designate one of the secondary indexers as a primary that may then respond to the request. In one embodiment, the new primary indexer may also be designated as the primary indexer for storing of data associated with an incremented GEN_ID. Subsequent requests for data may then employ the new GEN_ID.

In one embodiment, member indexers may store different 'slices' of data having different GEN_IDs. Moreover, as disclosed further below, the cluster environment with member indexers may be minimally impacted by a master failure. That is, because the forwarder device selects the member indexer to receive data for storage and replication distribution, the forwarder device need not interact with the master device. Indexers may operate to receive and/or distribute for replication and storage, data, journals, or the like, independent of the master device. Further, although the master device manages GEN_IDs for data, requests for data may employ earlier GEN_ID numbers and therefore are also minimally impacted by a master device failure. Although a master device may be aware of which indexer is primary or secondary for each bucket of data being managed in the system, the master device does not manage the data or the state of the data per se, as the state of the data is also known by each of the member indexers in the aggregate. Therefore, if the master device is unavailable for some amount of time, availability of data reception, indexing, and searching are not immediately impacted. However, in one embodiment, the master device may manage not only the GEN_ID transition updates, but may also re-assign, as appropriate, replication indexers when a member indexer fails.

Illustrative Operating Environment

Figure 1:
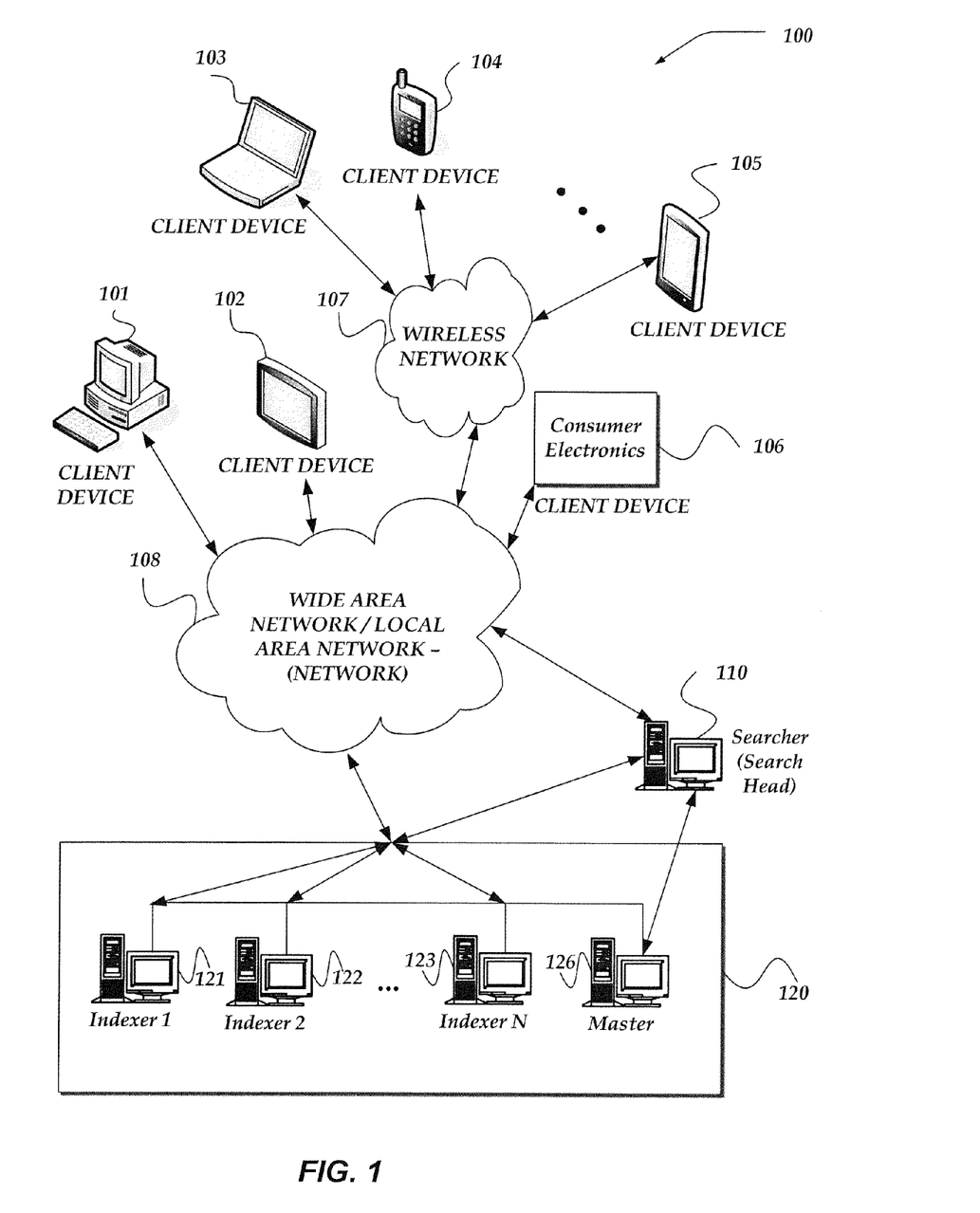
FIG. 1 illustrates a system diagram of one embodiment of an environment in which the embodiments may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, searcher device 110, and cluster 120. Cluster 120 includes a plurality of cluster member indexers 121-123, and master device 126.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, searcher device 110, and/or any one or more of member indexers 121-123, master device 126, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device. Such end-user account, in one non-limiting example, may be configured to enable the end-user to manage one or more online activities, including in one non-limiting example, search activities, social networking activities, browse various websites, communicate with other users, or the like.

Moreover, in one embodiment, client devices 101-106 may include an application described further below as a forwarder. In one embodiment, the forwarder application may enable a client device to operate as a forwarder device to provide data to one or more members of cluster backup. As described below, the forwarder device may select an indexer within cluster 120 based on any of a variety of mechanisms, to receive the data for backup and to manage replication of the data based on a provided replication factor. Forwarder devices may make the selection based on a load-balancing algorithm, including a least loaded algorithm, a fastest response algorithm, a round-robin, random selection, or any of a variety of other mechanisms. Should the selected member indexer fail to provide an acknowledgement in response to receiving data from the forwarder device for storage, the forwarder device may elect to select a different indexer to manage the data storage and replication. In one embodiment, the forwarder device may receive information about the available member indexers 121-123 from master device 126.

Client devices 101-106 may also interact with searcher device 110 for recovery of data, to perform search queries on stored data, or any of a variety of other queries of data stored and replicated by cluster 120.

Thus, searcher device 110 may be virtually any network device that is configured to perform search, recovery, or other operations upon the data managed by cluster 120. In one embodiment, searcher device 110 may obtain information from master device 126 indicating a current GEN_ID for data for which searcher device 110 is to request. In some embodiments, the searcher device 110 may also receive a list of indexers to contact. Searcher device 110 may then send a request for such data to cluster 120 that may include requests for multiple sets of data and the GEN_ID from which to obtain the data. Searcher device 110 receives from a designated primary member indexer within cluster 120 for the requested data and GEN_ID. In one embodiment, searcher device 110 may perform various actions on the received data, and/or provide the data to one or more client devices.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, cluster 120, and searcher device 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

Cluster 120 typically is configured to include loosely coupled network devices that may cooperate to provide another device with access to a service, resource, and the like.

In one embodiment, cluster 120 is configured to manage data storage and replication of data received by one or more client devices operating as forwarder devices.

One embodiment, of a cluster member indexer is disclosed in more detail below in conjunction with FIG. 3. Briefly, however, cluster 120 includes a plurality of member indexers 121-123, and master device 126. While master device 126 is illustrated as a separate device from member indexers 121-123, it should be understood that other embodiments are not so constrained. For example, one of member indexers 121-123 may also be configured to operate and perform functions of master device 126 as well as operating to perform functions of an indexer device. Further, should master device 126 fail or otherwise be determined to be non-responsive, any one or more of member indexers 121-123 may elect one of the member indexers 121-123 to become a master device. Such election may be performed using any mechanism, including a priority selection, a least loaded selection, a random selection, or the like.

Further, each of member indexers 121-123 and master device 126 are configured to communicate with each other to send messages, determine a status of another device within cluster 120, respond to requests for status or other information, or the like. For example, based on a timer, or other algorithm member indexers 121-123 and master device 126 may send out a ping or other status request to one or more of the other devices within cluster 126. As used herein, a ping may represent any message sent out this is arranged to expect to receive a response. In this manner, a failure to respond to the status request (or ping) may indicate that the device not responding has failed. Then based on which device is determined to have failed, master device 126 or one of the member indexers 121-123 may assume the functions of the failed device.

In one embodiment, master device 126 may be any network device that is configured to monitor status of the member indexers 121-123, assign GEN_IDs, and indicate available indexers useable as secondary indexers for data storage/replication. Master device 126 may also provide information to client devices 101-106 and/or searcher device 110, including information about indexers available for storing data, GEN_IDs and updates to GEN_IDs, and the like. Master device 126 may also coordinate planned and unplanned transitions of indexers from secondary indexer status to primary indexer status for a given bucket or buckets of data. While master device 126 may maintain status of which indexers are primary, secondary, is storing what data for a given GEN_ID, master device 126 need not touch or otherwise manage the data or journals about the data. Master device 126 may perform other actions as described herein.

Member indexers 121-123 represent elements of the described embodiments that may index and store data and events, and provide replication of the data and events. Indexers 121-123 may collect, parse, and store data to facilitate fast and accurate information retrieval. Index design for storage may incorporate interdisciplinary concepts from linguistics, cognitive psychology, mathematics, informatics, physics, and computer science. Also, indexes may reside in flat files in a data store on a file system. Index files may be managed to facilitate flexible searching and fast data retrieval, eventually archiving them according to a configurable schedule, request, or the like. During indexing, incoming raw data from, for example, a forwarder device, may be processed to enable fast search and analysis, the results of which may be stored in an index, or bucket. As part of the indexing process, the indexer 121-123 may add knowledge to the data in various ways, including by: separating a data stream into individual, searchable events; creating or identifying timestamps; extracting fields such as host, source, and source type; performing user-defined actions on the incoming data, such as identifying custom fields, masking sensitive data, writing new or modified keys, applying breaking rules for multi-line events, filtering unwanted events, and routing events to specified indexes or servers, and the like. In one embodiment, indexers 121-123 may also generate journals of the received raw data that provides meta-data about the raw data, and/or other information that may be useable for building and/or otherwise regenerating portions of the raw data or information about the raw data.

Indexers 121-123 may be selected as a primary indexer for at least a portion of the received data and manage that data in buckets as described further below in conjunction with FIG. 4. A designated primary indexer may provide acknowledgements to a forwarder device indicating that the received data has been received and/or has been stored in a bucket. A designated primary indexer may further generate a journal about the received data. In one embodiment, the designated primary indexer may then send the data and journal to one or more other indexers to be replicated. The primary indexer may further resend the data or send the data to a different indexer for replication based on whether or not an acknowledgement is received from the secondary indexer(s).

While indexers 121-123 are illustrated within cluster 120, as residing on different network devices, other embodiments are not so constrained. In another embodiment, each indexer may reside with a blade server architecture. Generally, a blade server is a stripped down server computing device with a modular design optimized to minimize a use of physical space and energy. A blade enclosure can include several blade servers and provide each with power, cooling, network interfaces, input/output interfaces, and resource management. A plurality of blade servers may also be included in one enclosure that shares resources provided by the enclosure to reduce size, power, and/or cost.

Moreover, indexers 121-123 need not be physically collocated. Thus, for example, indexer 121 may reside in California, while indexers 122-123 might reside on the east coast of America, or the like. Clearly, other variations are also envisaged. Moreover, while three indexers are illustrated, cluster 120 may include many more or less indexers than illustrated.

Illustrative Client Device

Figure 2:
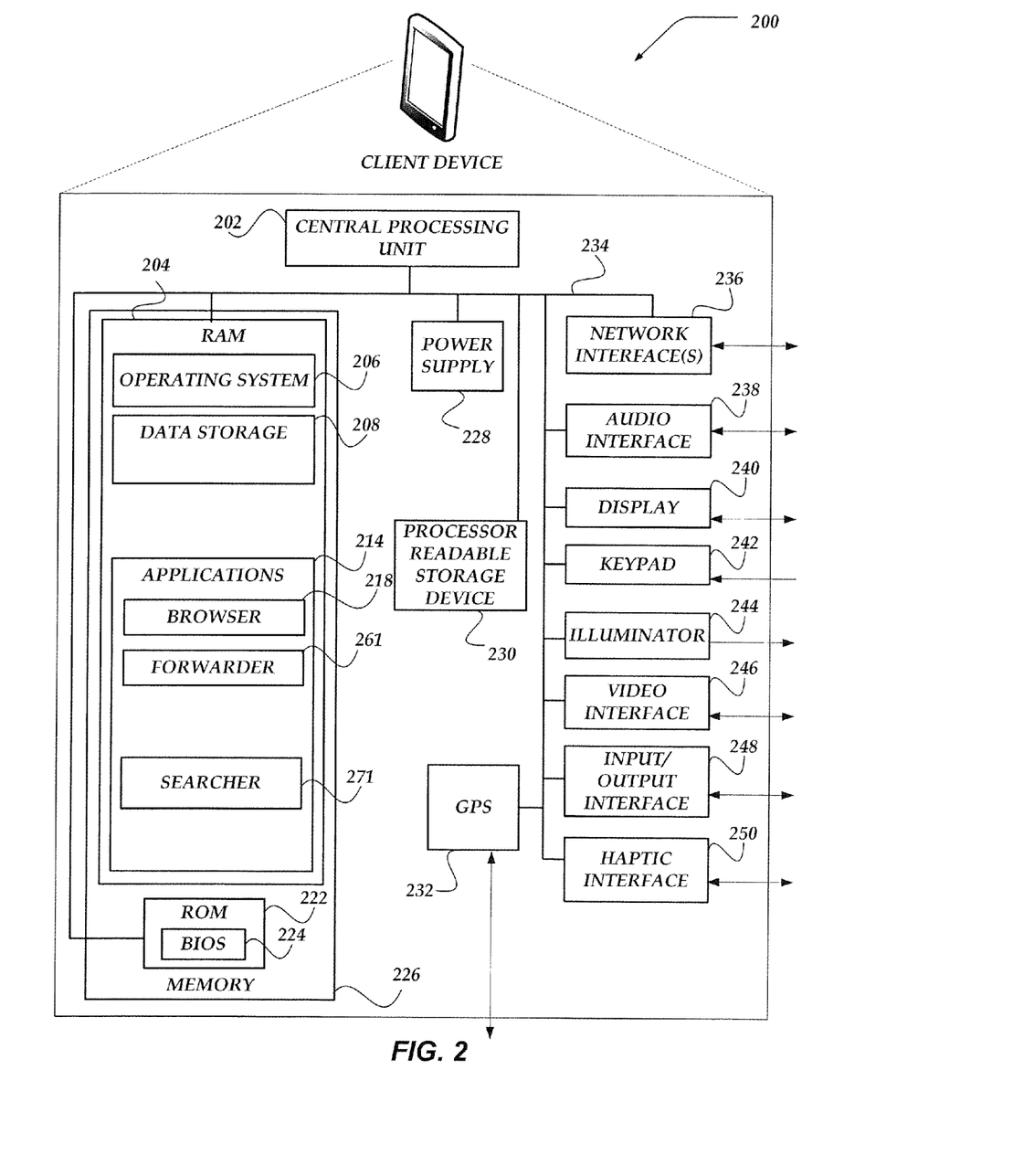
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI). At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in a level of trust of at least one component of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store various raw data to be sent to cluster 120 for storage. At least a portion of the information may also be stored on another component of network device 200, including, but not limited to computer readable storage device 230, a disk drive or other computer-readable storage device (not shown) within client device 200.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, searcher 271, and forwarder 261.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive data from another computing device, such as cluster 120, and/or searcher device 110 of FIG. 1.

Forwarder 261 may enable client device 200 to operate as a forwarder device to prepare and send data about various actions of client device 200, to cluster 120 of FIG. 1 for storage. Forwarder 261 may collect the data, in real-time, and/or non-real-time. Forwarder 261 may query master device 126 for information about available indexers within cluster 120 that may be available for storage of data. In one embodiment, forwarder 261 may receive address information about the indexers to enable forwarder 261 to send data.

Forwarder 261 may select an indexer to receive the data based on any of a variety of criteria, including, but not limited to a load-balancing algorithm. In one embodiment, selection of an indexer may result in that indexer becoming a primary indexer for that data. In one embodiment should forwarder 261 not receive an acknowledgement from at least the primary indexer in response to sending data, forwarder 261 may select a different indexer in which to send data.

In one embodiment, forwarder 261 may specify an amount of space for storing of the data, and/or may specify a replication factor indicating a number of times the data is to be replicated. However, in other embodiments, the replication factor might be configured on an indexer based on, for example, a type of data being replicated. Forwarder 261 may also indicate when to close a bucket for data, open a new bucket, or the like.

Searcher 271 may perform functions described above for searcher device 110 of FIG. 1. Thus, in one embodiment, searcher 271 may operate local to client device 200 to enable client device 200 to perform searches, data recovery, or other actions upon the data provided to indexers through at least forwarder 261. In one embodiment, searcher 271 may obtain status information from master device 126 including a GEN_ID for data of interest by searcher 271. Searcher 271 may then send a request for the data to cluster 120 along with a GEN_ID. Searcher 271 then receives a response that from one or more primary indexers associated with the requested data and GEN_ID.

Illustrative Network Device

Figure 3:
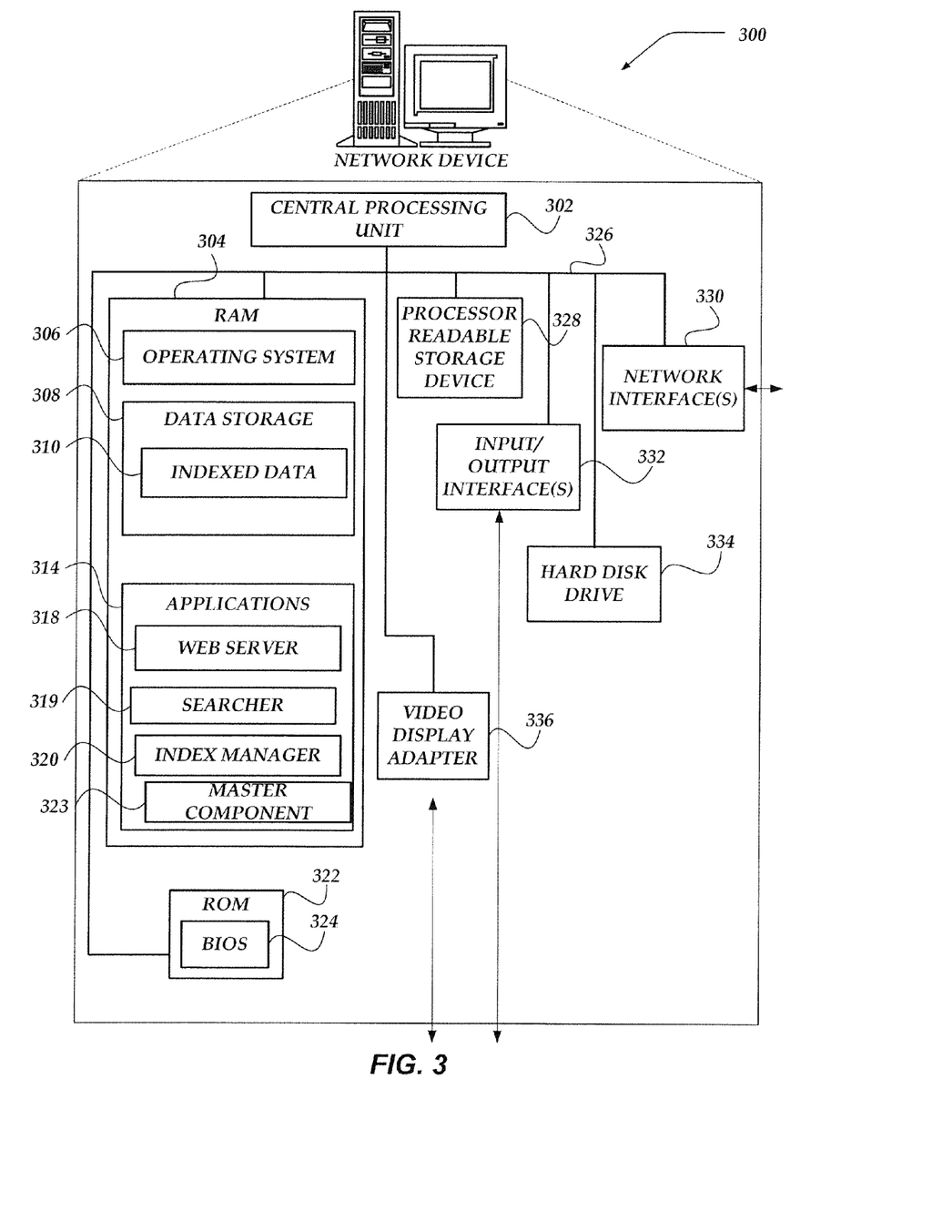
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the innovations. Network device 300 may be configured to operate as a server, a client, a peer, a host, or any other device. Network device 300 may represent, for example member indexers 121-123 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store indexed data 310. Indexed data 310 is described below in more detail in conjunction with FIG. 4. Briefly, however, indexed data 310 may be arranged in a variety of buckets usable to store and/or otherwise manage data from a forwarder device, and/or other data and meta-data, including journals, about the data.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, searcher 319, index manager 320, and master component 323 may also be included.

Briefly, master component 323 may be configured to enable network device 300 to operate as a master device performing actions as described herein. In one embodiment, master component 323 may also be configured to manage status communications with other indexers, election of a replacement master device, should a current master device for the cluster fail, or the like.

Index manager 320 may perform a variety of actions as disclosed herein to enable network device 300 to operate as an indexer within the cluster. Thus, index manager 320 may manage collection of data, generation of journals about the data, storage of the data, generations of buckets for storage of the data, closing and opening of buckets based on a variety of criteria, and provide acknowledgements in response to receiving data for storage. Index manager 320 may also receive information indicating that network device 300 is a primary indexer, secondary indexer, or the like, for particular one or more buckets of data, receive and manage data based on a GEN-ID, or the like.

Index manager 320 may also perform actions to send the data to another indexer to be replicated, operate to reconfigure network device 300 from a secondary indexer to a primary indexer or the reverse, and/or otherwise manage the data based on a GEN_ID.

Searcher 319 may be arranged to respond to queries about the data stored and/or otherwise managed by network device 300. Searcher 319 may receive a request for data, determine whether network device 300 is a primary indexer for the data based on the data requested and GEN_ID, and in response, provide the data. Searcher 319 may determine that network device 300 is secondary for the requested data and GEN_ID and select to ignore the request for the data.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. In one embodiment, web server 318 may provide an interface usable by a client device to searcher 319, index manager 323, indexed data 310, or the like.

General Operation

The operation of certain aspects of various embodiments will now be described with respect to FIGS. 4-7. FIG. 4 illustrates one non-limiting, non-exhaustive example of managing redundant data backup and recovery across a plurality of member indexers within a cluster.

Figure 4:
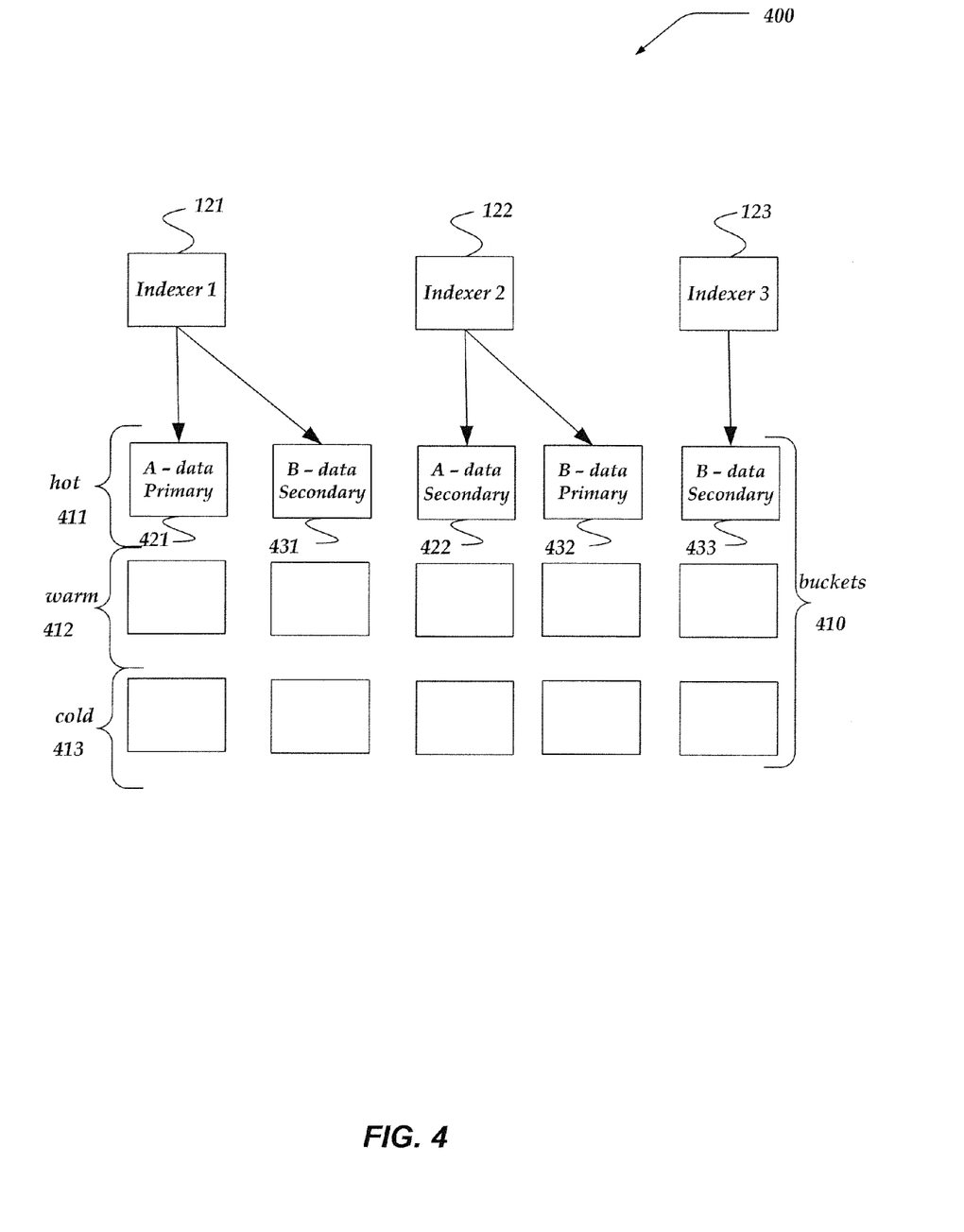
FIG. 4 illustrates one non-limiting, non-exhaustive example of managing redundant data backup and recovery across a plurality of member indexers within a cluster.

As shown, architecture 400 of FIG. 4 illustrated a plurality of buckets 410 managed by indexers 121-123. Briefly, a bucket represents a mechanism usable for storing and/or otherwise managed data and events received from a forwarder device. As shown, buckets 410 may be designated as hot 411, warm 412, cold 413 buckets, to indicate whether a bucket is open to receive and store data (hot), recently closed for receiving data but available for access of data (warm), or closed and may be unavailable readily for access of data (cold). In one embodiment, based on any of a variety of criteria, buckets may have an expiration policy, indicating when a bucket is to be closed, moved from hot to warm to cold, to even removed from the system of buckets 410.

Architecture 400 illustrates that an indexer may have a plurality of buckets in which to manage data. Moreover, as shown, one indexer may be a primary indexer for some data, and a secondary indexer for other data. See for example, indexer 121 is primary for A-data 421, and secondary for B-data 431, while indexer 122 is primary for B-data 432 and secondary for A-data 422. Also shown, is that based on the replication factor, there may be more than one secondary indexer, such as indexer 123 (for B-data 433).

Figure 5:
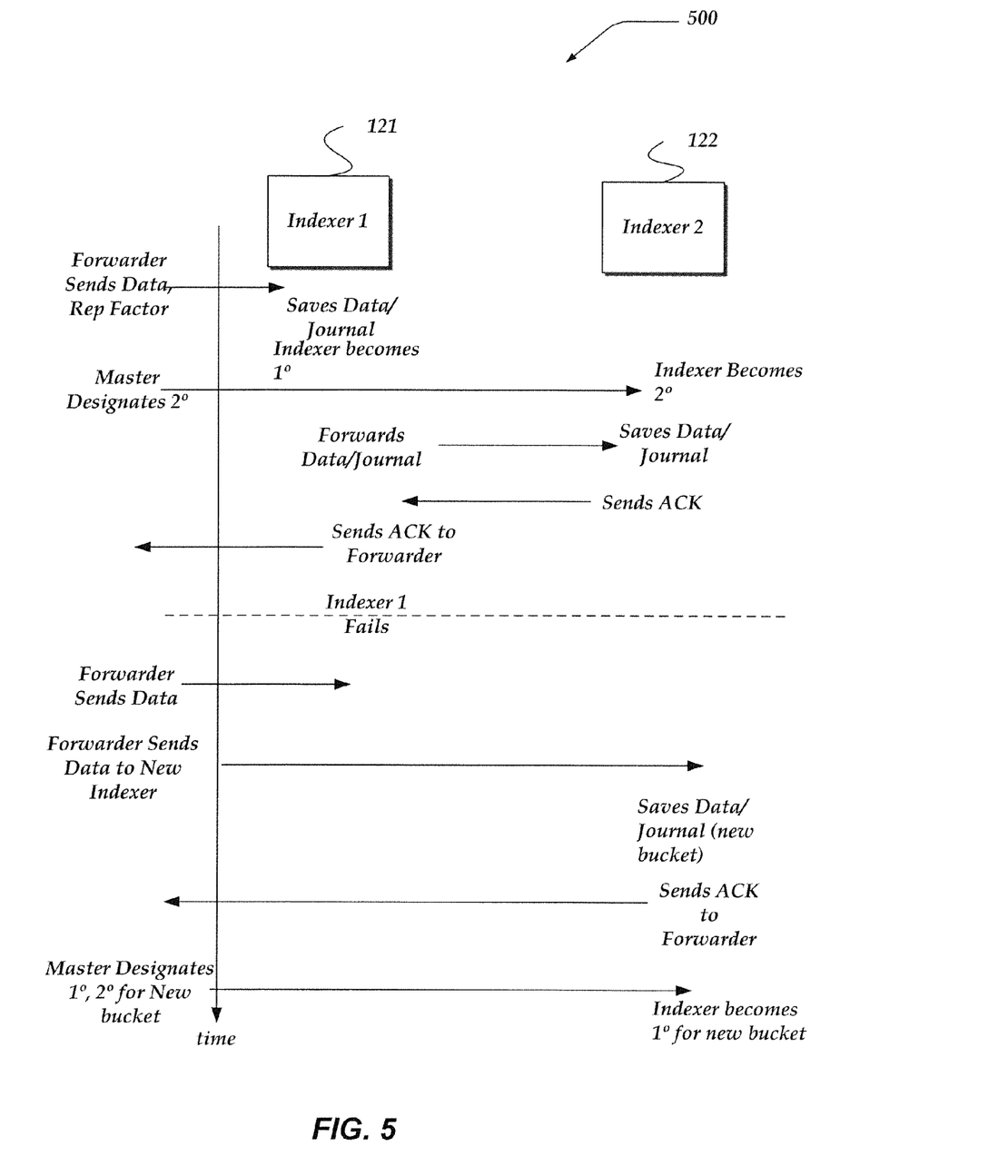
FIG. 5 illustrates one embodiment of a signal flow usable to manage redundant (replication) of data across multiple member indexers within a cluster.

FIG. 5 illustrates one embodiment of a signal flow usable to manage redundant (replication) of data across multiple member indexers within a cluster. As shown in flow 500, indexer 121 and indexer 122 communicate with each other, a master device, and/or forwarder device. Time is indicated as flowing downwards. Further, 1° and 2° indicate primary and secondary, respectively. It should also be noted that while more or less communications may occur between at least these devices, those shown are sufficient to disclose an illustrative embodiment for practicing the innovations.

As shown, forwarder device, based on any of variety of criteria selects indexer 121 and send data and a replication factor value to indexer 121 to store the data, and to further forward the data to other indexers for replication. In one embodiment, receiving of the data from a forwarder device may initiate opening or otherwise creation of a hot bucket for storage of the data. In one embodiment, indexer 121 may receive information from the master device indicating a GEN_ID for the bucket.

Indexer 121, assuming it is functional and active (has not failed), then prepares and saves the data to the hot bucket. As noted above, in one embodiment, the received data may be referred to as a "slice." That is, in one embodiment, the slice may represent a small amount of data, typically of a few kilobytes in size—although other sizes may also be received. Further, indexer 121 may generate a journal or perform other actions on the data as discussed above. The journal and results of the actions may also be saved within the bucket.

Indexer 121 may, in one embodiment, receive information from the master device indicating other indexers, such as indexer 122, that is assigned or otherwise available to be a secondary indexer for the data. In another embodiment, indexer 121 may employ the replication factor and send the data to the indicated number of other indexers, thereby indicating that they are to become secondary indexers for the data. The master device may then update information about which devices are primary or secondary for the data.

In one embodiment, indexer 122 receives the data/journal from indexer 121 and saves the data, operating as a secondary indexer. Assuming that indexer 122 has not failed, operating as a secondary indexer, indexer 122 provides an acknowledgment to indexer 121 that it has received and stored the data/journal. Should indexer 122 not provide an acknowledgement within a defined amount of time, indexer 121 may elect to resend the data/journal and/or select a different indexer as a secondary indexer for the data. In one embodiment, because GEN_ID is global, each indexer may further store the data in a bucket having the GEN_ID as an identifier.

Independent of whether or not indexer 121 receives an acknowledgment from indexer 122, when indexer 121 has received and stored the data, indexer 121 provides an acknowledgement to the forwarder device.

Shown is an example of what happens when indexer 121 fails. As shown, forwarder device may send data to indexer 121 for a new hot bucket. However, because the forwarder device does not receive an acknowledgement, the forwarder may seek to send the data to another indexer based on any of a variety of selection criteria. In this instance, again assuming that indexer 122 is active; it receives the data, generates a journal, creates a hot bucket for the data, and returns an acknowledgement to the forwarder device. Indexer 122 then becomes the primary indexer for this data.

Figure 6:
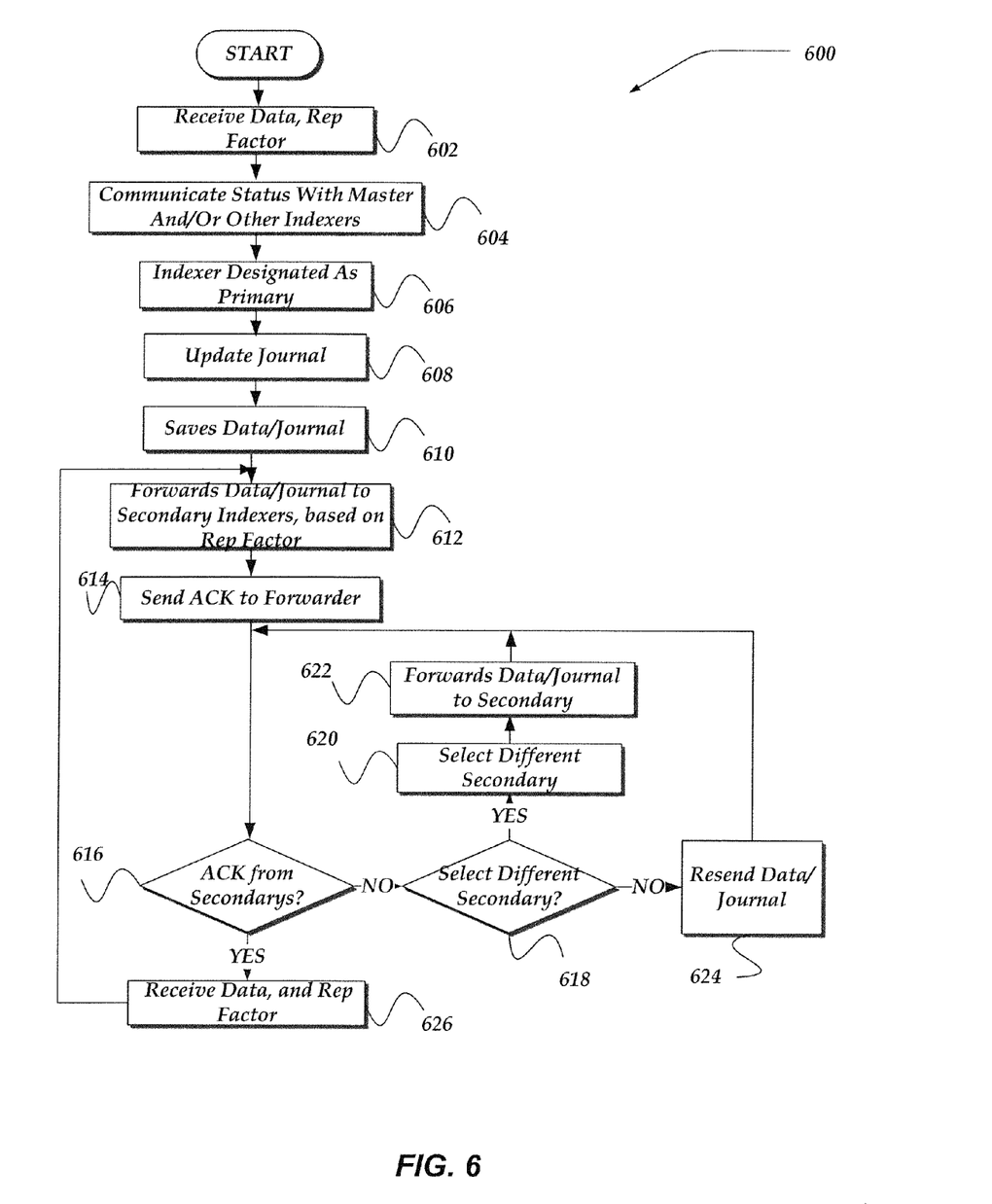
FIG. 6 illustrates a flow chart of one embodiment of a process usable to manage redundant (replication) of data across multiple member indexers within a cluster.

FIG. 6 illustrates a flow chart of one embodiment of a process usable to manage redundant (replication) of data across multiple member indexers within a cluster. Process 600 of FIG. 6 may be performed by an indexer within a cluster as discussed above in conjunction with FIG. 1.

Process 600 begins, after a start, wherein data is received. In one embodiment, a replication factor might also be received. Processing flows to block 604 where, in one embodiment, communications of status may be performed between the master device, and/or other indexers. In one embodiment, the communications may indicate an availability of the other indexers to operate as a secondary indexer, a GEN_ID, or the like.

Process 600 continues to block 606 where in one embodiment, the indexer receiving the data from the forwarder device is designated as the primary indexer for that data and GEN_ID. Continuing next to block 608, the journal is created and/or updated as discussed above. Flowing to block 610, the data and journal are stored into a hot bucket having the GEN_ID. At block 612, the data/journal are forwarded to one or more other indexers to operate as secondary indexers for the data having the GEN_ID. At block 614, an acknowledgement that the data has been received and/or stored by the primary indexer is sent to the forwarder device.

Flowing next to decision block 616 a determination is made whether an acknowledgement is received from each of the designated secondary indexers. If not, then processing flows to decision block 618; otherwise, processing flows to block 626.

At decision block 618, a determination is made whether to select a different secondary indexer. This may be based, in part, on a licensing or service level agreement with the forwarder device, the replication factor, or the like. In any event, if another secondary indexer is to be selected, processing flows to block 620 where a different indexer is select, and at block 622, the data/journal is sent to the selected indexer. Processing then loops back to decision block 616. At block 624, the data/journal may be resent to the secondary indexer. Processing loops back to decision block 616.

At block 626, the primary indexer may receive another slice of data to be stored in the hot bucket for the identified GEN_ID. Processing then continues back to block 612.

Figure 7:
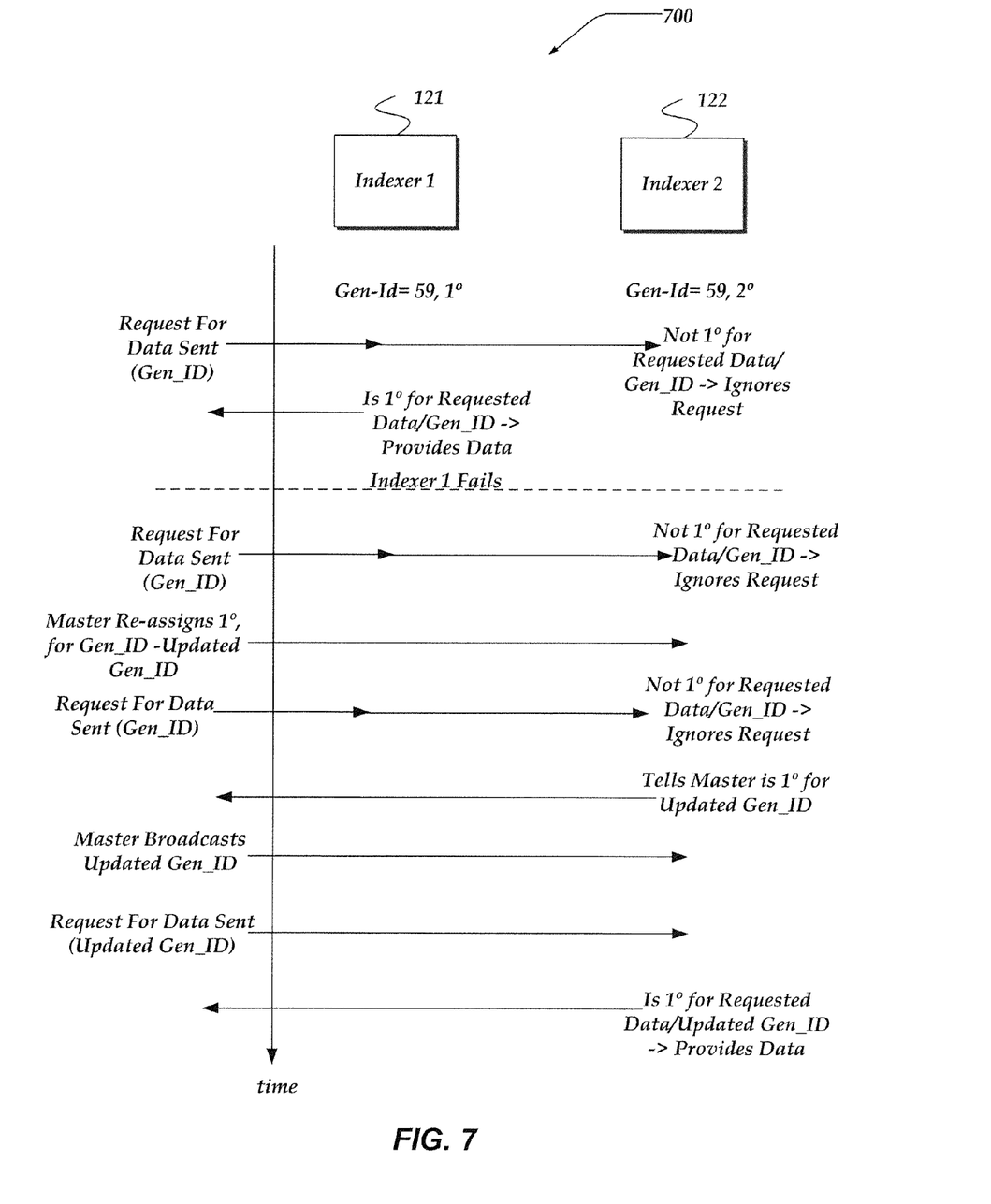
FIG. 7 illustrates non-limiting, non-exhaustive examples of managing a request for data during a member indexer failure within a cluster.

While data storage is one aspect of the innovations, another is managing of requests for the stored data. Thus, FIG. 7 illustrates non-limiting, non-exhaustive examples of managing a request for data during a member indexer failure within a cluster. Time is illustrated as flowing downwards.

As shown, flow 700 of FIG. 7 represents signal flows between a searcher device, master device, and indexers, such as discussed above in conjunction with FIG. 1. It should also be noted that while more or less communications may occur between at least these devices, those shown are sufficient to disclose an illustrative embodiment for practicing the innovations.

As shown, indexer 121 is primary indexer for the data under discussion at GEN_ID=59, while indexer 122 is secondary indexer for the data.

A request for the data is received from a searcher device. In one embodiment, the searcher device provides the GEN_ID for the data requested. As illustrated the request may be broadcast to each of the indexers within the cluster. However, because indexer 122 is not the primary indexer, it ignores the request, and indexer 121 which is primary for the data instead provides a response to the data request. In this manner, the same data is not provided more than once to the same request.

Now, consider that indexer 121 fails. When another request is received, in one embodiment, because there is no primary indexer, a response might not be provided. However, in one embodiment, the request for the data might be delayed at least until indexer 122 is provided sufficient time to reconfigure and become the new primary indexer for the data. In one embodiment, the master device might initiate this action. However, in another embodiment, the secondary indexers might also recognize that the primary indexer has failed, and elect among themselves a new primary indexer for the data. In one embodiment, the GEN_ID may also be incremented as illustrated in flow 700.

However, in still another embodiment, the searcher device may elect to wait until a new primary indexer is available, or elect to proceed with a partial data response.

In any event, as shown above, while the master device may be aware of which indexer is primary or secondary, and where data may be stored, as well as managing GEN_IDs, the cluster may still operate should the master device fail. That is because the data is still managed by the indexers, and thus, the indexers are not dependent upon the master device for the data. As noted, election of the primary indexer (and potentially even the secondary indexers) may be achieved without the master device's intervention. Further, it is even possible that failure of a primary indexer may be resolved while the master device is failed. Additionally, searches and other data queries may use earlier GEN_ID values.

However, as noted because GEN_ID increments, there may be value in being aware of a history of the GEN_ID, and which indexer was/is primary for that GEN_ID value. Thus, in one embodiment, an indexer might be primary for one value of GEN_ID for some data, and be secondary or otherwise unrelated to the data at a different GEN_ID. Thus, in one embodiment, search requests may provide multiple GEN_IDs, and receive responses from different primary indexers based on the different GEN_IDs.

For example, a first search request might request searches be performed by an indexer, using a first GEN_ID value, while a second search request might be requested to be performed by an indexer using a second, different, GEN_ID value. Further, while the requests might be received by multiple indexers, because each indexer knows whether or not they are primary for different buckets at different GEN_ID values, each of the requests will receive responses that are complete and non-redundant sets of results even though which indexers search which buckets may change.

In one embodiment, a bit map may be employed to provide such multiple GEN_ID usages. For example, an index value may have bits of some range, such as 64 bits. Other ranges may also be used. In this example, some set of bits may indicate that searches for the data may occur on one indexer, while setting of other bits indicate that the other portion of searches are to be performed on another, different indexer. This feature may further be useable to indicate, for example, that for some of the data, one indexer is primary, and for other portions of the data, a different indexer is primary. This may be useful for implementing, for example, multi-geographic storage policies. For example, indexer 121 might be primary to store data for west coast, and indexer 122 might be primary to store data for east coast. Further, based on this type of bit mapping extension, different replication factors might also be used based on the geography, or the like.

In any event, it will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-implemented method, comprising:
receiving, at an indexer, (i) a first query to search a subset of data accessible to the indexer, and (ii) a first identifier indicating that the indexer has primary responsibility for responding to the first query with a result from a search of the subset of data that is based on the first query;
receiving, at the indexer, (i) a second query to search the subset of data and (ii) a second identifier different from the first identifier and indicating that the indexer does not have primary responsibility for responding to the second query with a result from a search of the subset of data that is based on the second query;
determining, at the indexer, based on the first identifier, and independent from having access to the subset of data, that the indexer should respond to the first query with the result from the search of the subset of data that is based on the first query; and
determining, at the indexer, based on the second identifier, and independent from having access to the subset of data, that the indexer should not respond to the second query with the result from the search of the subset of data that is based on the second query.

2. The method of claim 1, wherein the first query and the second query are identical.

3. The method of claim 1, wherein the first query and the second query differ.

4. The method of claim 1, further comprising:
receiving, at the indexer, raw data;
separating the raw data into a plurality of events included in the subset of data;
determining, for each event in the plurality of events, a time stamp; and
storing each event in the plurality of events in a manner making it searchable by the indexer.

5. The method of claim 1, further comprising:
receiving, at the indexer, the subset of data;
storing, by the indexer, the subset of data; and
based on storing the subset of data, sending an acknowledgement message.

6. The method of claim 1, further comprising, prior to receiving the first query:
receiving, at the indexer, the subset of data;
storing, by the indexer, the subset of data;
identifying a replication factor that indicates a number of times that the subset of data is to be replicated; and
forwarding the subset of data to a number of other indexers, wherein the number corresponds to the replication factor.

7. The method of claim 1, further comprising:
receiving, at the indexer, the subset of data;
storing, by the indexer, the subset of data;
identifying, at the indexer, a replication factor that indicates a number of times that the subset of data is to be replicated;
forwarding, by the indexer, the subset of data to a number of other indexers, wherein the number corresponds to the replication factor;
determining that an acknowledgement receipt, responsive to the forwarding the subset of data, has not been received from at least one of the other indexers; and
upon determining that the acknowledgement receipt has not been received, forwarding the subset of data to another indexer not in the other indexers.

8. The method of claim 1, wherein a copy of the subset of data is accessible by at least one other indexer, and wherein the first identifier indicates that the at least one other indexer does not have primary responsibility for responding to the first query with the result from the search of the subset of data that is based on the first query.

9. The method of claim 1, wherein the indexer determines that the indexer should respond to the first query with the result from the search of the subset of data that is based on the first query by comparing the first identifier with a notification from a master about when the indexer should respond to a query associated with a given identifier.

10. A system comprising:
one or more data processors; and
a non-transitory computer-readable storage medium containing instructions which when executed on the one or more data processors, cause the one or more processors to perform operations including:
receiving, at an indexer, (i) a first query to search a subset of data accessible to the indexer, and (ii) a first identifier indicating that the indexer has primary responsibility for responding to the first query with a result from a search of the subset of data that is based on the first query;
receiving, at the indexer, (i) a second query to search the subset of data and (ii) a second identifier different from the first identifier and indicating that the indexer does not have primary responsibility for responding to the second query with a result from a search of the subset of data that is based on the second query;
determining, at the indexer, based on the first identifier, and independent from having access to the subset of data, that the indexer should respond to the first query with the result from the search of the subset of data that is based on the first query; and
determining, at the indexer, based on the second identifier, and independent from having access to the subset of data, that the indexer should not respond to the second query with the result from the search of the subset of data that is based on the second query.

11. The system of claim 10, wherein the first query and the second query are identical.

12. The system of claim 10, wherein the first query and the second query differ.

13. The system of claim 10, the operations further comprising:
receiving, at the indexer, raw data;
separating the raw data into a plurality of events included in the subset of data;
determining, for each event in the plurality of events, a time stamp; and
storing each event in the plurality of events in a manner making it searchable by the indexer.

14. The system of claim 10, the operations further comprising:
receiving, at the indexer, the subset of data;
storing, by the indexer, the subset of data; and
based on storing the subset of data, sending an acknowledgement message.

15. The system of claim 10, the operations further comprising, prior to receiving the first query:
receiving, at the indexer, the subset of data;
storing, by the indexer, the subset of data;
identifying a replication factor that indicates a number of times that the subset of data is to be replicated; and
forwarding the subset of data to a number of other indexers, wherein the number corresponds to the replication factor.

16. The system of claim 10, the operations further comprising:
receiving, at the indexer, the subset of data;
storing, by the indexer, the subset of data;
identifying, at the indexer, a replication factor that indicates a number of times that the subset of data is to be replicated;
forwarding, by the indexer, the subset of data to a number of other indexers, wherein the number corresponds to the replication factor;
determining that an acknowledgement receipt, responsive to the forwarding the subset of data, has not been received from at least one of the other indexers; and
upon determining that the acknowledgement receipt has not been received, forwarding the subset of data to another indexer not in the other indexers.

17. The system of claim 10, wherein a copy of the subset of data is accessible by at least one other indexer, and wherein the first identifier indicates that the at least one other indexer does not have primary responsibility for responding to the first query with the result from the search of the subset of data that is based on the first query.

18. The system of claim 10, wherein the indexer determines that the indexer should respond to the first query with the result from the search of the subset of data that is based on the first query by comparing the first identifier with a notification from a master about when the indexer should respond to a query associated with a given identifier.

19. A computer-program product tangibly embodied in a non-transitory machine-readable storage medium, including instructions to cause one or more data processors perform operations including:
- receiving, at an indexer, (i) a first query to search a subset of data accessible to the indexer, and (ii) a first identifier indicating that the indexer has primary responsibility for responding to the first query with a result from a search of the subset of data that is based on the first query;
- receiving, at the indexer, (i) a second query to search the subset of data and (ii) a second identifier different from the first identifier and indicating that the indexer does not have primary responsibility for responding to the second query with a result from a search of the subset of data that is based on the second query;
- determining, at the indexer, based on the first identifier, and independent from having access to the subset of data, that the indexer should respond to the first query with the result from the search of the subset of data that is based on the first query; and
- determining, at the indexer, based on the second identifier, and independent from having access to the subset of data, that the indexer should not respond to the second query with the result from the search of the subset of data that is based on the second query.

20. The computer-program product of claim 19, wherein the first query and the second query are identical.

21. The computer-program product of claim 19, wherein the first query and the second query differ.

22. The computer-program product of claim 19, the operations further comprising:
- receiving, at the indexer, raw data;
- separating the raw data into a plurality of events included in the subset of data;
- determining, for each event in the plurality of events, a time stamp; and
- storing each event in the plurality of events in a manner making it searchable by the indexer.

23. The computer-program product of claim 19, the operations further comprising:
- receiving, at the indexer, the subset of data;
- storing, by the indexer, the subset of data; and
- based on storing the subset of data, sending an acknowledgement message.

24. The computer-program product of claim 19, the operations further comprising, prior to receiving the first query:
- receiving, at the indexer, the subset of data;
- storing, by the indexer, the subset of data;
- identifying a replication factor that indicates a number of times that the subset of data is to be replicated; and
- forwarding the subset of data to a number of other indexers, wherein the number corresponds to the replication factor.

25. The computer-program product of claim 19, the operations further comprising:
- receiving, at the indexer, the subset of data;
- storing, by the indexer, the subset of data;
- identifying, at the indexer, a replication factor that indicates a number of times that the subset of data is to be replicated;
- forwarding, by the indexer, the subset of data to a number of other indexers, wherein the number corresponds to the replication factor;
- determining that an acknowledgement receipt, responsive to the forwarding the subset of data, has not been received from at least one of the other indexers; and
- upon determining that the acknowledgement receipt has not been received, forwarding the subset of data to another indexer not in the other indexers.

26. The computer-program product of claim 19, wherein a copy of the subset of data is accessible by at least one other indexer, and wherein the first identifier indicates that the at least one other indexer does not have primary responsibility for responding to the first query with the result from the search of the subset of data that is based on the first query.

27. The computer-program product of claim 19, wherein the indexer determines that the indexer should respond to the first query with the result from the search of the subset of data that is based on the first query by comparing the first identifier with a notification from a master about when the indexer should respond to a query associated with a given identifier.

28. The method of claim 1, wherein the search of the subset of data that is based on the first query is identical to the search of the subset of data that is based on the second query.

29. The method of claim 1, wherein the search of the subset of data that is based on the first query differs from the search of the subset of data that is based on the second query.

30. The method of claim 1, wherein the first query also requires a search of a second subset of data accessible to the indexer, and wherein the first identifier also indicates that the indexer does not have primary responsibility for responding to the first query with a result from a search of the second subset of data that is based on the first query.

* * * * *